United States Patent [19]
Ritter et al.

[11] Patent Number: 5,001,473
[45] Date of Patent: Mar. 19, 1991

[54] METHOD OF CONTROLLING A MULTIPLICITY OF UNITS OF VIDEO APPARATUS

[75] Inventors: Uwe Ritter, Darmstadt; Rainer Sturm, Gross-Gerau, both of Fed. Rep. of Germany

[73] Assignee: BTS Broadcast Television Systems GmbH, Darmstadt, Fed. Rep. of Germany

[21] Appl. No.: 517,500

[22] Filed: Apr. 30, 1990

Related U.S. Application Data

[63] Continuation-in-part of Ser. No. 316,231, Feb. 27, 1989, abandoned.

[30] Foreign Application Priority Data

Mar. 18, 1988 [DE] Fed. Rep. of Germany ....... 3809129

[51] Int. Cl.$^5$ ............................................. H04Q 9/00
[52] U.S. Cl. ........................... 340/825.52; 340/825.08; 340/825.22; 358/185
[58] Field of Search ....................... 340/825.07, 825.08, 340/825.22, 825.52; 370/85.2, 85.3, 124; 358/181, 185, 903, 86

[56] References Cited

U.S. PATENT DOCUMENTS

| | | | |
|---|---|---|---|
| 4,581,645 | 4/1986 | Beyers, Jr. ........................... | 358/181 |
| 4,686,698 | 8/1987 | Tomkins et al. ..................... | 358/181 |
| 4,689,683 | 8/1987 | Efron ................................... | 358/185 |
| 4,706,081 | 11/1987 | Hart et al. ............................. | 370/61 |
| 4,808,992 | 2/1989 | Beyers, Jr. et al. ................. | 358/181 |

OTHER PUBLICATIONS

ANSI/IEEE Std 802.3, Carrier Sense Multiple Access, with Collision Detection, 1985, pp. 13-14, 24-31.
Cosgrove, "The LDM600 Machine Control System", International Broadcast Engineer, vol. 12, No. 176, pp. 50-55, Mar. 1981.
Anon, "Television Network Automated by Minicomputer-Controlled Channels", Computer Design, vol. 15, No. 11, Nov. 1976, pp. 50, 59, 62, 66, 70.
Modulares Paralleles Studio-Interface—"Technische Mitteilungen des RFZ", Heft 3/1985, pp. 49-54.

*Primary Examiner*—Donald J. Yusko
*Assistant Examiner*—Edwin C. Holloway, III
*Attorney, Agent, or Firm*—Frishauf, Holtz, Goodman & Woodward

[57] ABSTRACT

Several video cassette recorders are among studio video equipments operated from a control unit at a control desk as a cluster of studio video equipments interconnected by a coaxial line constituting a digital data bus. The video cassette recorders have simple addresses and the control unit has a multiplicity of addresses which are all recognizable at the video cassette equipment as an address for the control unit. In starting an operation a return address is selected at the control unit and stored therein so as to exclude normal responses or notifications from the recorders directed to that address, while that address is supplied to a selected video recorder as the source address of an initial communication to the selected video recorder. That address is stored in the selected video recorder as the address for response to the control unit. The control unit can, without stopping the operation of the first selected video recorder in playback assign and store another return address and communicate it to another video recorder which is to be put into operation to record the playback from the first video recorder. Since the control unit is exclusively connected to the second video recorder when the recording is complete, the termination of the operation is performed by stopping the second video recorder and then reassigning the first return address in the control unit so as to assign the control unit to the first video recorder, and then stopping the first video recorder.

5 Claims, 3 Drawing Sheets

METHOD OF CONTROLLING A MULTIPLICITY OF UNITS OF VIDEO APPARATUS

This application is a continuation-in-part of application Ser. No. 07/316,231, filed Feb. 27, 1989, now abandoned.

CROSS-REFERENCE TO RELATED COPENDING APPLICATIONS:

1. Ser. No. 07/186,168; filed Apr. 26, 1988; now U.S. Pat. No. 4,902,989.
2. Ser. No. 07/191,011; filed May 6, 1988; now abandoned.

This invention concerns control of a considerable number of units of video apparatus from a single control location, as is particularly useful in a television broadcasting or recording studio or center.

A method is known from the periodical "Technische Mitteilungen des RFZ", Heft 3/1985, pgs. 49–54, for controlling video technical installations in which control information is passed on over so-called parallel interfaces through branches of a tree structure of communication. Control according to this known method utilizes a great deal of circuitry and switching and requires a multiplicity of control lines or cables. Furthermore, control systems of that type are not easily adaptable to other apparatus configurations with different functions.

SUMMARY OF THE INVENTION

It is an object of the present invention to provide a method for controlling apparatus units in modern video technology in considerable numbers or aggregates which is more flexible than what has heretofore been used and which is adaptable to rearrangement of configurations of aggregates of apparatus.

Briefly a number of apparatus units are combined to form a single aggregate or cluster of equipment unit and are connected together by a serial digital signal communication bus, each apparatus unit of the aggregate being provided with a standard interface which is adjustable and is capable of sending and receiving data telegrams, and preferably with a number of such interfaces. Each apparatus unit of the cluster has an intra-cluster address in the form, for example, of a 4-bit designation (up to 16 units of apparatus), or a 5-bit or 6-bit address for a larger cluster. This has the advantage that many apparatus units, for example magnetic recording devices or film scanners selectable within one control group can be operated simultaneously. The transmission of control information takes place over a single communication channel or path. The individual apparatus units will then not interfere with each other's behavior. This universal control connection can be provided for various tasks outside of an individual apparatus unit, so that a number of apparatus units can be collected together in a closed control system in which access can be obtained to all functions of an individual apparatus. For example an operating or control desk can be associated with a particular one of a number of magnetic recording equipments by dynamically configuring addresses, after which, leaving that equipment working, it can be associated with another, and so on. It is no longer necessary, then, to make a modification of fixed apparatus addresses conforming to a standard protocol such as that of IEEE Standard 802.3.

BRIEF DESCRIPTION OF THE DRAWINGS

Further details and advantages of the invention are explained below by way of illustrative embodiment with reference to the annexed drawings, in which.

DESCRIPTION OF THE ILLUSTRATED EMBODIMENTS

Figure 1:
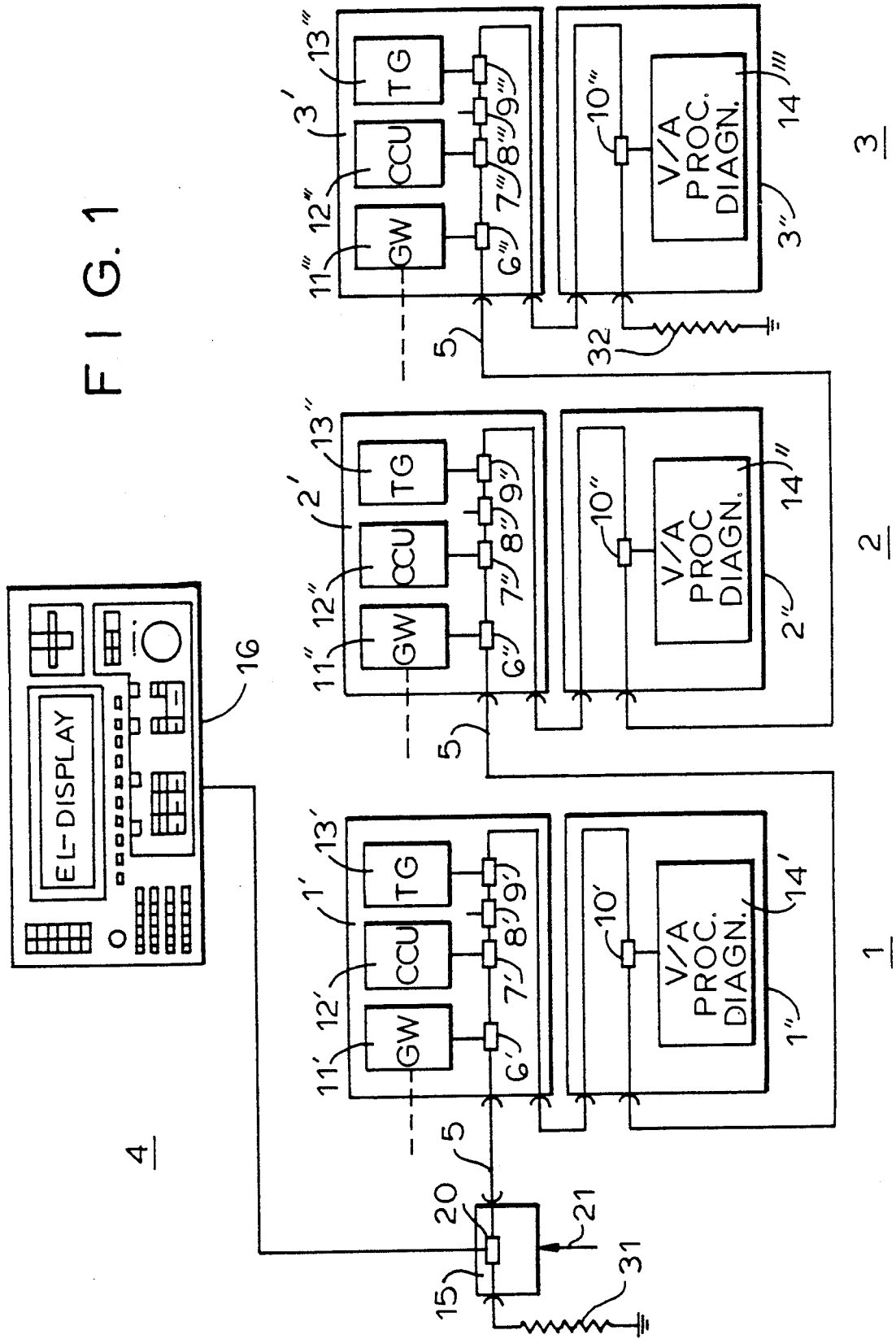
FIG. 1 is a circuit block diagram of three video cassette recorders having a common control system.

Three video cassette recorders 1, 2 and 3 are shown combined in an equipment cluster 4 in the drawing. Each of the video cassette recorders 1, 2 and 3 consists of a tape handling unit 1', 2', 3' and a video-audio processor and diagnostic test unit 1'', 2'', 3'' related thereto hereinafter referred to simply as a "processor". The three digital video cassette recorders are connected with each other over a serial digital signal bus system 5. In the illustrated example a coaxial cable connects the individual handling units and processor units of the digital video cassette recorders 1, 2 and 3. Within the tape handling units 1', 2', 3' and the processor units 1'', 2'', 3'' there are a number of coupling elements 6, 7, 8, 9 and 10 for connection with the bus 5. For example in the case of the video cassette recorder 1 the coupling elements 6' to 9' are inserted into the coaxial cable of the bus system 5 within the tape handling unit 1' and the coupling element 10' likewise within the processor unit 1''. In the digital video cassette recorders 2, and 3 correspondingly, the coupling elements 6'' to 10'' and 6''' to 10''' are inserted in the coaxial cable. The coupling elements 6–10 serve for connecting with computer controlled sending and receiving units further mentioned below.

In copending U.S. patent application Ser. No. 07/186,168, filed Apr. 26, 1988 now U.S. Pat. No. 4,902,989, the construction and manner of operation of such coupling elements is described. Such a coupling element esstentially operates as a tapped pass-through filter.

Sending and receiving units 11', 12', 13' and 14' which serve for sending and data telegrams are connected respectively to the coupling units 6', 7', 9' and 10'. Coupling unit 8' indicates that an additional sending and receiving unit might well be used in a video recording unit. As used in the system of copending application No. 07/191,011, the format of the data telegrams can for example correspond to the IEEE-802.3 Standard, whereby the following is prescribed: 8 bytes for a preamble, 6 bytes each for destination and source addresses, 2 bytes for the length, 46–1518 bytes for the actual data information and 4 bytes for a cyclic protective redundance block. The transmision rate of the data telegrams can for example be 10 Mbytes per second. Further details regarding such transmissions are given in copending application Ser. No. 07/191,011, filed May 6, 1988. In that patent application a system for transmission of data and information within an equipment is described. Advantageously it is possible to use in this system the economical integrated circuits chips which are made for the Ethernets and the Cheapernets, which are protocol-compatible with each other. Thus for example one of these standard local networks (LAN) controls as sending and receiving unit 11', a so-called "gateway"; as unit 12', a central control unit; as unit 13', a time code generator, and as unit 14' a video and audio processor. In contrast to the intra-equipment control concept of the above-mentioned co-pending application Ser. No. 07/191,011, the method of the present invention combines several major apparatus units systematically into a control group (cluster) so that all functions of the individual apparatus units are accessible as further described below. Within that group it is not necessary for the addresses and the telegrams to conform with the IEEE-802.3 standard.

The coaxial cable of the bus system 5 is also connected to an adaptor unit 15 provided for connection to the central operation desk 16. This adaptor 15 contains, in addition to a coupling element 20 serving the operation desk 16, also an input 21 for supplying operating voltage for the operation control desk. Terminating resistor networks 31 and 32 are provided at the ends of the bus system 5.

Individual participating major units of the control group according to the invention can also be allocated to the control unit 16 by dynamic address change. With this feature of the invention the single control unit 16 can be allocated to an equipment cluster 4 combining a considerable number of apparatus units.

Figure 2:
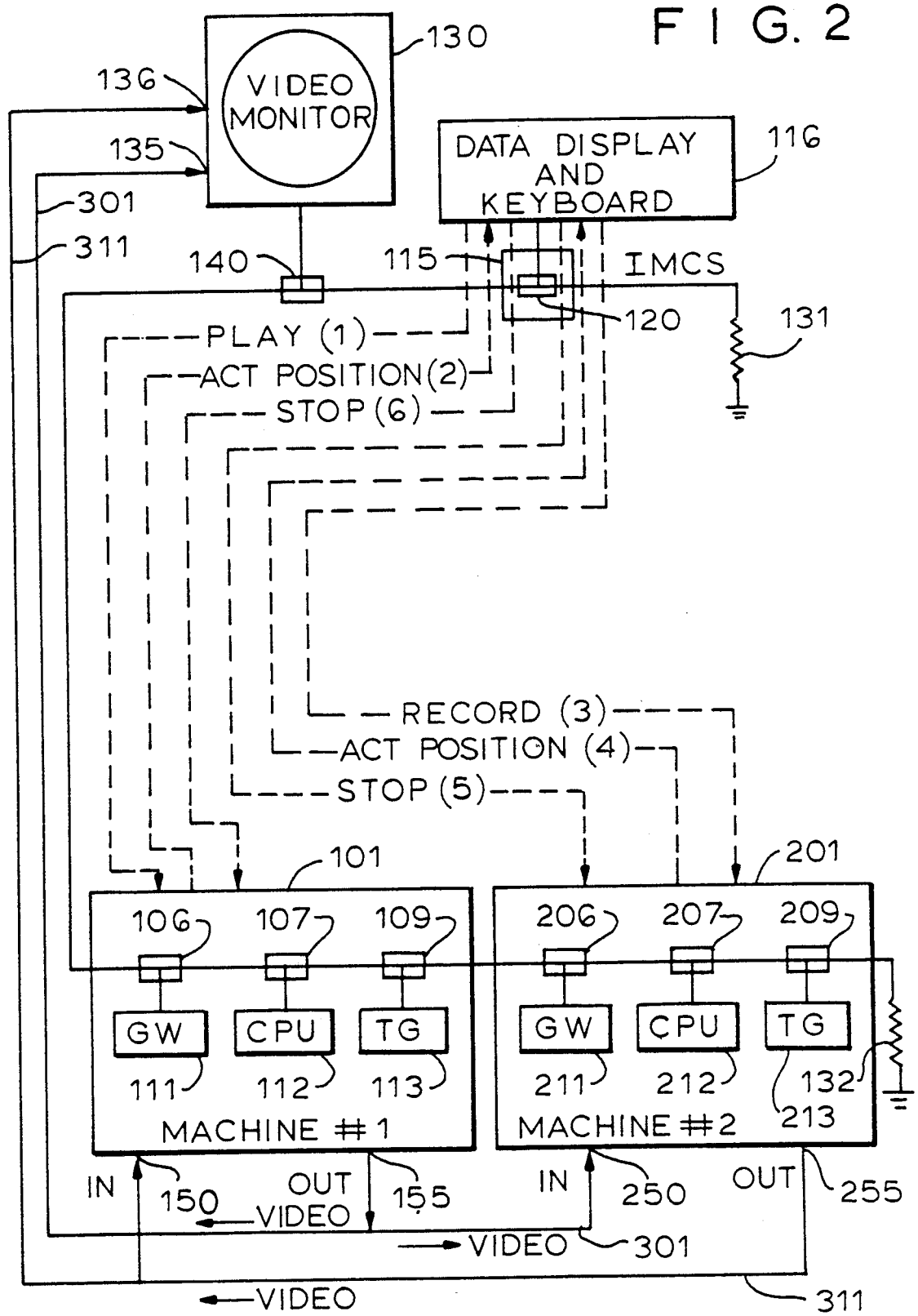
FIG. 2 is a schematic diagram for illustrating control of two video cassette recorders in an editing operation in the control of a single keyboard, in accordance with the invention.
Figure 3:
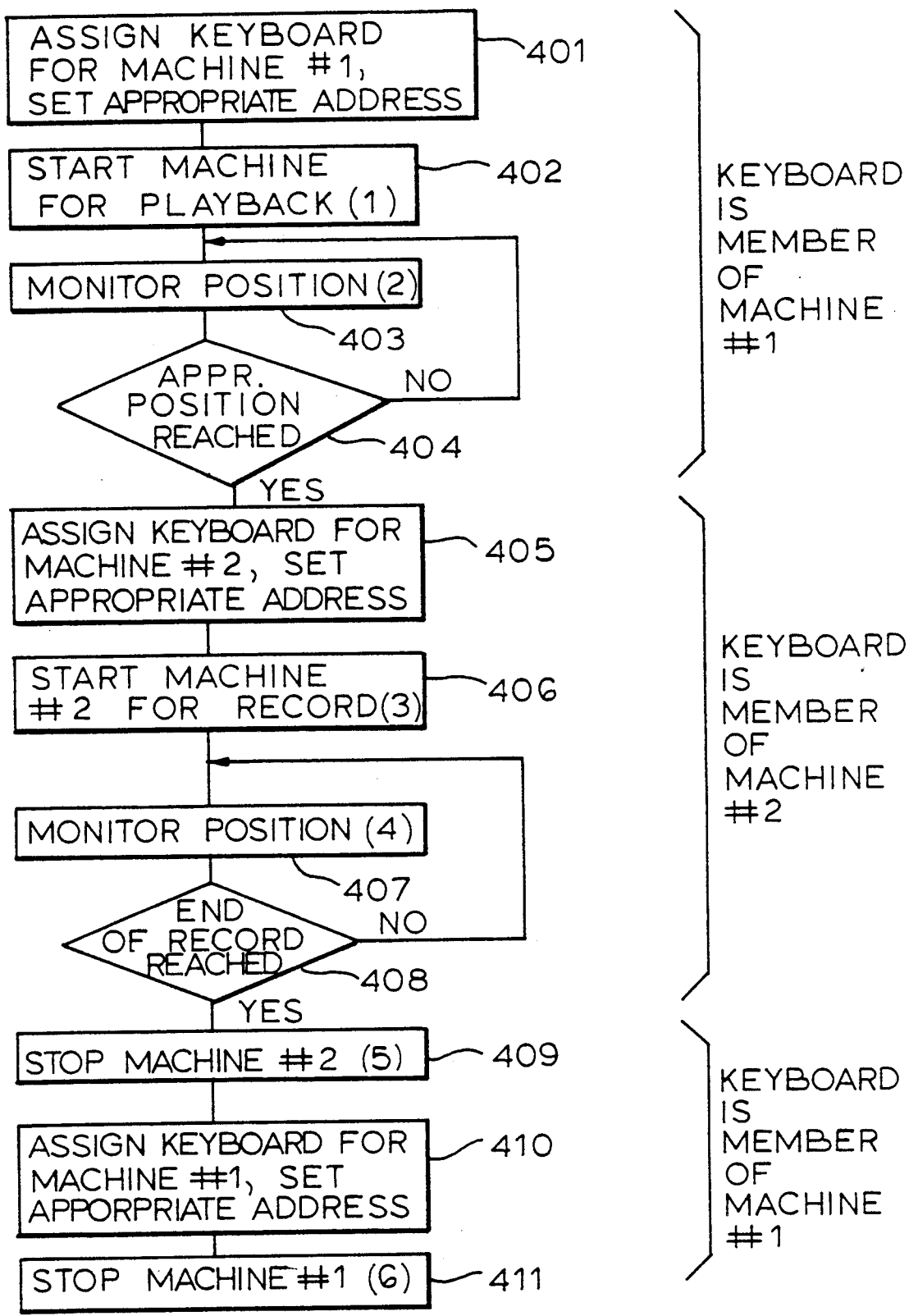
FIG. 3 is a flow diagram illustrating the method of the invention as applied to the editing process illustrated with reference to FIG. 2.

The control unit 16 can be equipped to control editing operations using two professional video cassette recorder machines, for example. This is illustrated in FIGS. 2 and 3. FIG. 2 shows only the two recorder machines used in the example, in order to simplify the drawing, and the audio-video processor (and test) units of the recorders shown in FIG. 1 are not shown in FIG. 2 to simplify the drawing. On the other hand, FIG. 2 shows the video connections between the recorders and with a monitor at the control desk, which are details that were omitted in FIG. 1 to simplify the drawing. The monitor could be built into the control unit 16, but in FIG. 2 it is shown as a separate unit at the control desk.

In FIG. 2 the keyboard 116 corresponds to the control unit 16 of FIG. 1 and is coupled with the rest of the system shown by the serial data bus 105, which corresponds to the bus 5 of FIG. 1, through the coupler 120, which corresponds to the coupler 20 of FIG. 1, within the adapter 115, which corresponds to the adapter 15 of FIG. 1. The bus 105 can be referred in the present context to as an internal machine communication system (IMCS) bus.

The bus 105 is coupled with the professional type video cassette recorder 101, hereinafter also referred to as machine #1, by the couplers 106, 107 and 109, corresponding to the couplers 6, 7 and 9 of FIG. 1 which are respectively connected to the gateway unit 111, the central processing unit (CPU) 112 and the time-code generator (TG) 113. The other connections of the video cassette recorder 101 to the bus 105 which correspond to other couplers shown in FIG. 1 are not shown in FIG. 2, in order to simplify the drawing.

The second professional type video cassette recorder 201, hereinafter sometimes referred to as machine #2, similarly has units 211, 212 and 213 shown coupled to the bus 105 respectively through couplers 206, 207 and 209.

At the location of the keyboard 116, which is usually a control desk, in addition to the data display referred to in connection with the control unit 16 of FIG. 1, a video monitor 130 is provided which is controlled over the bus 105 through a coupler 140. The bus 105 has a terminating network 131, 132 at each end, in each case symbolized by a resistance connected to ground.

As shown in FIG. 2 the video cassette recorders 101 and 201 respectively have video inputs 150 and 250 and likewise video outputs 155 and 255. If more than two machines are present in the cluster, as for example in the case of FIG. 1, it would be necessary for each machine to have a plurality of video inputs, in order to make the respective video outputs of other video cassette recorders available for selection, as the active input, by each machine under control of the bus 105. The video outputs 155 and 255 are connected not only with the video inputs 250 and 150, respectively, but they are also respectively connected to the video inputs 135 and 136 of the video monitor 130. There again, if there were more video cassette recorders in the cluster, additional video inputs would be made available at the monitor.

The recorders 101 and 201 of the cluster may be physically coupled to other equipment through their respective gateway units 111 and 211, but such other equipment outside the cluster cannot be controlled by the keyboard 116 with the convenience and versatility with which the equipment within the cluster is controlled over the bus 105. The destination addresses for the equipment outside of the cluster (coupled through the gateway units in the cluster are not defined in the way that the addresses of the equipments in the cluster) are defined.

FIG. 2 has some dotted lines interconnecting the keyboard 116 with the video cassette recorder 101 and 201, three of them at the left going between the keyboard 116 and the recorder 101 and the three at the right going between the keyboard 116 and the recorder 201. These dotted lines do not represent additional connections but they represent interactions of the keyboard and either the recorder 101 or the recorder 201 which are described in FIG. 3, where recorder 101 is referred to as machine #1 and recorder 201 is referred to as machine #2.

FIG. 3 shows how an editing operation can be performed in accordance with the invention by so-called dynamic addressing by which the keyboard 116 can function as the keyboard exclusively for machine #1 and as the keyboard exclusively for machine #2, in alternation.

It is assumed for the purpose of FIG. 3 that it is desired to have recorded video information reproduced by machine #1 and that when a certain part of the record being played back is reached, to record the information on tape which is available for recording machine #2. It is also assumed that the machines #1 and #2 respectively have addresses 1 and 2, the monitor 130 the address 3, various unshown equipments have addresses 4, 5, 6 and 7 and that addresses 8, 9, 10 . . . can be used for the keyboard 16. These addresses can be assumed to be 4-bit codes.

As shown in FIG. 3, the first step is to assign the keyboard to machine #1, which is done by setting a return address, by which only machine #1 can reach it for initiating or maintaining interaction, for example the address 8. Each message frame contains a destination address and a source addresses. When machine #1 is addressed by the destination address specified in an initial message to machine #1, the "source address "0 that is transmitted to machine #1 will then be the address 8, which will be recognized by machine #1 as the keyboard 16, which thereafter operates as the keyboard control serving exclusively for machine #1. This address 8 is so recognized only by machine #1.

The next step, shown at 402 in FIG. 3 is to start machine #1 in playback. This is identified as command [1] in FIG. 2. Then the next step 403 is to monitor the position of the record, command [2], which results in time code data from the unit 113 of machine #1 being displayed on the data display of the keyboard 116 and perhaps also in video output from line 301 being displayed on the video monitor 130 (which would involve a command to the monitor not shown in FIG. 2). The next step 404 is a decision relating to the tape position data in machine #1.

The edit points may have been previously determined in terms of time code or by information which was added to the record in a previous running through of the record being played back. The video monitor is mainly for showing the operation that a signal is really being recorded: it is too crude to determine the edit point exactly. So long as the edit point is not reached, the return signal from stage 404 ("no") continues the monitoring action specified by stage 403. As soon as the desired position is reached the operation proceeds to stage 405 in which the keyboard is assigned to machine #2 with setting of the appropriate address, now address 9 for access by machine #2 to the keyboard unit 116 and its data display. As in stage 401, that is done simply by the initial message from the keyboard to the selected machine. This address 9 recognized only by machine #2 as the new address of the keyboard 16. Thus any transmissions from machine #1, which is still running, will not be able to reach the keyboard.

Stage 406, starting of machine #2 in recording operation (command [3] in FIG. 2) then takes place immediately. That is followed by a second monitoring stage 407 and a second decision stage 408. The second decision stage depends on information from machine #2, for example time codes from unit 213. When the position for the end of this recording is reached, the keyboard is still assigned to machine #2 and it accordingly then stops machine #2 in stage 409 (command [5] in FIG. 2), followed by stage 410 in which the keyboard is reassigned for machine #1 with setting of appropriate return address (again 8), as before in stage 410. Then machine #1 is stopped in state 411, which completes the operation shown in FIG. 3.

It will be noted from FIG. 3 that while the keyboard operates as a part of machine #2, machine #1 continues to operate in playback as was commanded while the keyboard was a member of machine #1.

There are several ways of providing the changes of address for response of equipment to the keyboard and display unit 116. The simpler system would be to have a separate response address for each of the equipments in the cluster. Thus addresses 0 through 7 would be provided for addressing the equipments and addresses 8 through 15 for responses directed to the keyboard by the respective equipments. On the other hand, since the various equipments in the cluster subject to control by the keyboard would rarely all be controlled in a single operation in which one or the other would be controlled in some kind of a sequence, the number of addresses for responding to the keyboard could well be only half as many as the number of equipment addresses. In this case when all the equipments are stopped or otherwise finally disconnected from an operation conducted by the keyboard, the stored return addresses should be erased so as to prevent interference with future operations using the same set of return addresses for a different set of equipments which might contain some equipments of a previously used set.

By the above-identified system of assigning return addresses, the keyboard and data display unit 116 can be made inaccessible for interaction in either direction by all but one other equipment in the cluster.

All of the addresses usable by the control unit as a return address should have a common feature by which they can be recognized as referring to the control unit. In the illustrated case the feature was that they were greater than 7 in an appropriate binary code. It could be that a certain bit place is 1 or 0. It could be an artificial feature: for example the feature that a circuit in the equipment in the control unit designed to respond to any of the predetermined digital addresses will produce a certain prescribed response.

Furthermore, if all the equipments are made unable to direct messages to any of the addresses assigned to equipments other than the control unit, the common feature of addresses assigned by the control unit as one of its return addresses will be that the address in question is the source address of a message received by an equipment other than the control unit.

It may be desired to prevent the keyboard from effectively sending a message to machine #1 while it is still controlling machine #2. In the system as so far described, any message to machine #1 that requires a response to the keyboard will fail. A further provision could block even transmission of a message to machine #1 in such a case. Such further provision would limit the destination addressing, during the assignment of a particular return address, to the destination address of the equipment to which the return address confided. In such a case it may be necessary to incorporate the video monitor in the control unit 16.

The addition of equipment, or its removal or substitution can be provided for the cluster quite readily in accordance with the invention. This can be done by making it possible for the keyboard to assign equipment addresses to the various equipments at some initial stage of a series of operations. That may require some kind of check system by which the keyboard operator can verify which equipments have which addresses at any particular time.

The above-described system of a variable return address for a control unit, or its extension to variable addresses for equipment units of a cluster, involves a situation which is normally intolerable within an electronic data processing system. In conventional data processing systems it cannot be accepted that the keyboard and display unit at a control desk could by a change of address prevent mutual access between it and all but one (or all but a few) of many equipments of a working group each having a central processing unit (CPU).

For the purposes of the invention it is essential that when the keyboard assigns itself to a particular equipment such as a video tape recorder, it then becomes inaccessible for purposes of interaction from all other equipments in the cluster. It will still be possible, without departing from the invention, to provide communication of an unexpected malfunction from an equipment that is participating in the operation but not at the moment under control of the keyboard if such a malfunction threatens the integrity of the operation as a whole.

For example, while machine #1 is playing back and the keyboard is controlling machine #2 in which the output of machine #1 is being recorded, something goes wrong with machine #1 so that it cannto perform its part of the operation at that time, a message might be addressed to an interrupt address or to an alarm address that would produce a visible signal in the neighborhood of the keyboard.

Although the invention has been described with reference to a particular illustrative method, it will be understood that variations and modifications are possible within the inventive concept.

We claim:

1. A method of controlling a collection of video studio equipments from a control unit at a control position, said control unit and said equipments being connected together for at least control and monitoring purposes by a serial digital communication bus system equipped with couplers respectively for said equipments and said control unit, said method comprising the steps of:

reserving a plurality of first addresses exclusively having a common feature by which each of said addresses is recognizable as designating that the address relates to said control unit;

assigning second addresses, distinguishable from said first addresses by absence of said common feature of said first addresses, respectively to said video studio equipments;

selecting at said control unit, at a selected time, a first one of said first addresses as an exclusive address for receiving at least all normal responses and notifications from said video studio equipments until another of said first addresses is so selected, the selection as aforesaid of a said first address automatically setting said exclusiveness into effect at said control unit;

transmitting said selected said first address from said control unit to a selected first one of said video studio equipments by a communication thereto and thereby causing said selected first address to be stored in said selected first video studio equipment as the normal address for response and notification of said control unit;

at a selected time thereafter, selecting at said control unit a second one of said first addresses and replacing therewith said first one of said first addresses as said exclusive address for receiving responses and notifications from said video studio equipments until another of said first addresses is so selected, followed by transmitting said second one of said first addresses from said control unit to a second one of said video studio equipments and thereby causing said selected second one of said first addresses to be stored in said second one of said studio video equipments as the normal address for response and notification to said control unit.

2. The method of claim 1, wherein after said transmitting of said selected first address to said selected first one of said video studio equipments, said selected first one of said video studio equipments is put into operation and controlled in said operation from said control unit and its operation is not stopped at said selected time at which said second one of said first addresses replaces said first one of said first addresses in said control unit, and further wherein after the transmitting of said second one of said first addresses to said second one of said video studio equipments, said second one of said video studio equipments is put into operation for cooperation with said first one of said studio video equipments, said operation of said second one of said studio video equipments being controlled from said control unit.

3. The method of claim 2, wherein at a selected time after the putting into operation of said second one of said studio video equipments, said selected time being finally selected automatically by data detection or comparison, the operation of said second one of said studio video equipments in cooperation with said first one of said studio video equipments is terminated and then or thereafter all operation of said second one of said studio video equipments is stopped, and wherein after stoppage of operation of said second one of said studio video equipments, said first one of said first addresses is again selected as an exclusive address for receiving responses and notifications from said video studio equipments as aforesaid, followed by the stopping from said control unit of operation of said first one of said video studio equipments.

4. The method of claim 3, wherein said data comparison by reference to which operation of said second one of said studio video equipments in cooperation with operation of said first one of said studio video equipments is terminated is performed by comparison of data entered in said control unit and data generated by operation of said second one of said studio video equipments.

5. The method of claim 1, wherein the transmitting of a selected first address from said control unit and thereby causing said selected first address to be stored in a selected video studio equipment as the normal address for response and notification to said control unit is performed by transmitting brief communication to said selected video studio equipment having that one of said second addresses assigned to said selected video equipment as the destination address of said communication and said selected first address as the source address of said communication.

* * * * *